United States Patent
Soman et al.

(10) Patent No.: US 9,692,554 B2
(45) Date of Patent: Jun. 27, 2017

(54) POWER LINE COMMUNICATION OPERATING FREQUENCY BAND SELECTION APPARATUS, SYSTEMS AND METHODS

(71) Applicant: TEXAS INSTRUMENTS INCORPORATED, Dallas, TX (US)

(72) Inventors: Mehul Soman, Dallas, TX (US); Tarkesh Pande, Richardson, TX (US); Il Han Kim, Allen, TX (US); Anuj Batra, Mountain View, CA (US); Minghua Fu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 95 days.

(21) Appl. No.: 14/885,715

(22) Filed: Oct. 16, 2015

(65) Prior Publication Data

US 2016/0127056 A1 May 5, 2016

Related U.S. Application Data

(60) Provisional application No. 62/072,052, filed on Oct. 29, 2014.

(51) Int. Cl.
*H04L 1/00* (2006.01)
*H04B 3/54* (2006.01)
*H04L 27/00* (2006.01)
*H04L 27/26* (2006.01)

(52) U.S. Cl.
CPC ............. *H04L 1/0045* (2013.01); *H04B 3/54* (2013.01); *H04L 27/0002* (2013.01); *H04L 27/2602* (2013.01)

(58) Field of Classification Search
CPC ........ H04B 17/336; H04B 3/54; H04L 1/0045
See application file for complete search history.

(56) References Cited

U.S. PATENT DOCUMENTS

| | | | |
|---|---|---|---|
| 6,185,423 B1 * | 2/2001 | Brown | H04W 36/06 455/434 |
| 2007/0135085 A1 * | 6/2007 | Iwamura | H04B 3/54 455/402 |
| 2008/0268782 A1 * | 10/2008 | Dateki | H04L 1/0029 455/62 |

(Continued)

*Primary Examiner* — Warner Wong
(74) *Attorney, Agent, or Firm* — John R. Pessetto; Charles A. Brill; Frank D. Cimino

(57) ABSTRACT

A band of interest is divided into band segments. A scan frame is sent by a transmitter at a transmitting PLC node across each band segment. A receiver at a receiving node scans the band segments, listening for the scan frame. Upon detecting a scan frame, the receiving node measures the signal quality of each OFDM subcarrier modulated with symbols from the scan frame. The subcarrier signal quality values are stored in a table. Upon completion of the scan process, the table contains a signal quality value for each subcarrier within the band of interest. The table is then analyzed to find an operating band consisting of subcarriers with a highest average signal quality or a band that results in greater than a pre-determined minimum signal quality. The invented methods and embodiments may operate periodically to readjust the operating band configuration in the presence of electromagnetic interference including time-variant interference.

20 Claims, 11 Drawing Sheets

(56) References Cited

U.S. PATENT DOCUMENTS

| | | | |
|---|---|---|---|
| 2012/0201155 A1* | 8/2012 | Du | H04B 3/54 370/252 |
| 2014/0269874 A1* | 9/2014 | Afkhami | H04B 3/04 375/227 |
| 2014/0286445 A1* | 9/2014 | Schneider | H04L 1/0606 375/257 |

* cited by examiner

POWER LINE COMMUNICATION OPERATING FREQUENCY BAND SELECTION APPARATUS, SYSTEMS AND METHODS

PRIORITY CLAIM

This application claims the benefit of priority under 35 U.S.C. §119(e) to U.S. Provisional Patent Application Ser. No. 62/072,052 titled "METHOD FOR OPTIMAL FREQUENCY BAND SELECTION FOR POWER LINE COMMUNICATION SYSTEM IN NARROWBAND INTERFERENCE CHANNELS," filed on Oct. 29, 2014 and incorporated herein by reference in its entirety.

TECHNICAL FIELD

Embodiments described herein relate to power line communication techniques, including structures and methods associated with dynamically selecting an operating frequency band in the presence of noise.

BACKGROUND INFORMATION

Power-line communication ("PLC") is a term used to describe the transmission and reception of data on conductors that are also used simultaneously for AC electric power distribution. Technical problems associated with PLC technologies include recovering the received signal in the presence of narrowband interference and impulse noise. A PLC system operating in an industrial environment may, for example, contend with narrowband noise induced into the conductors by industrial equipment such as welding machines.

FIG. 1 is a prior-art block diagram of a PLC system 100. A master node 105 includes a transmitter 107 to transmit packets to a receiver 109 in a slave node 110 across a downlink path 115. A transmitter 117 in the slave node 110 transmits packets to a receiver 119 in the master node 105 across an uplink path 120. Modern PLC systems are typically packet-based, operate in half-duplex mode, and transmit an orthogonal frequency division multiplexed ("OFDM") modulated carrier signal across two conductors of a power wiring circuit. Thus, the downlink path 115 and the uplink path 120 are typically implemented across the same two conductors in half-duplex mode and are generally distinguished as logical rather than physical paths. It is also noted that the terms "downlink" and "uplink" as used herein are arbitrarily chosen to refer to master-to-slave and slave-to-master packet traversal paths, respectively.

Various PLC standards specify various frequency bands, data rates and distance limits. Since the power distribution system is intended for transmission of AC power at typical frequencies of 50 or 60 Hz, power circuits have only a limited ability to carry higher frequencies. Low-frequency (100-200 kHz) carriers impressed on high-voltage transmission lines may carry one or two analog voice circuits, or telemetry and control circuits with an equivalent data rate of a few hundred bits per second. Such PLC channels may extend several miles. Higher data rates generally imply shorter ranges. For example, a PLC-implemented local area network operating at megabits per second may only cover one floor of an office building.

Narrowband PLC standards specify various frequency bands including the European Committee for Electrotechnical Standardization ("CENELEC") Band A (35 kHz-91 kHz), CENELEC Band B (98 kHz-122 kHz), the Association of Radio Industries and Businesses ("ARIB") band (154 kHz-403 kHz) and the Federal Communications Commission ("FCC") band (155 kHz-487 kHz). Other standards such as G3, IEEE1901.2 and PRIME specify characteristics of the physical layer, including numbers of sub-carriers associated with the OFDM PLC signal. The magnitudes of spectral components of interference overlapping a PLC signal may vary dynamically with time as rotating machinery, welding equipment, electronic power supplies and other sources of interference are powered up and shut down.

SUMMARY OF THE INVENTION

Structures and methods described herein dynamically select an operating band for transmission and reception of OFDM-encoded PLC frames during an operating band negotiation phase of operation. Both the spectral position and the width of the operating band are selected within an allowable frequency spectrum ("band of interest"). Some embodiments perform operating band negotiation operations independently for the downlink and the uplink. Consequently, the resulting operating band selected for the downlink may be different from the operating band selected for the uplink.

The band of interest is divided into band segments. An identical PLC OFDM test frame referred to hereinafter as a "scan frame" or "negotiation mode scan frame" is sent by a transmitter at a transmitting PLC node across each band segment. A receiver at a receiving node scans the band segments, listening for the scan frame. Upon detecting a scan frame, the receiving node senses a measure of signal quality associated with each OFDM subcarrier modulated with symbols from the scan frame. Various embodiments may use measures of subcarrier-specific signal quality such as signal-to-noise ratio ("SNR"), received signal strength indication ("RSSI"), etc. Example embodiments and methods described below use individual subcarrier SNR values as measured at the receiver of a PLC node as a subcarrier signal quality indication. However it is emphasized that no loss of generality is intended thereby and that some embodiments may use subcarrier signal quality indications other than SNR.

The subcarrier signal quality values (hereinafter SNR values) measured at the receiving node are stored in an SNR table. Upon completion of the scan process, the SNR table contains an SNR value for each subcarrier within the band of interest. The SNR table is then analyzed to find an operating band consisting of subcarriers with a highest average SNR or a band that results in greater than a pre-determined minimum average SNR. The invented methods and embodiments may operate periodically to readjust the operating band configuration in the presence of electromagnetic interference including time-variant interference.

As previously mentioned, the terms "downlink" and "uplink" as used herein are arbitrarily chosen to refer to logical master-to-slave and slave-to-master packet traversal paths, respectively. For the most part, embodiments of various PLC apparatus structures operating according to methods described herein are identical for master and slave PLC nodes. Accordingly, the Detailed Description below applies to both master and slave nodes and will not be repeated for each. Any differences will be noted.

DETAILED DESCRIPTION

Figure 2:
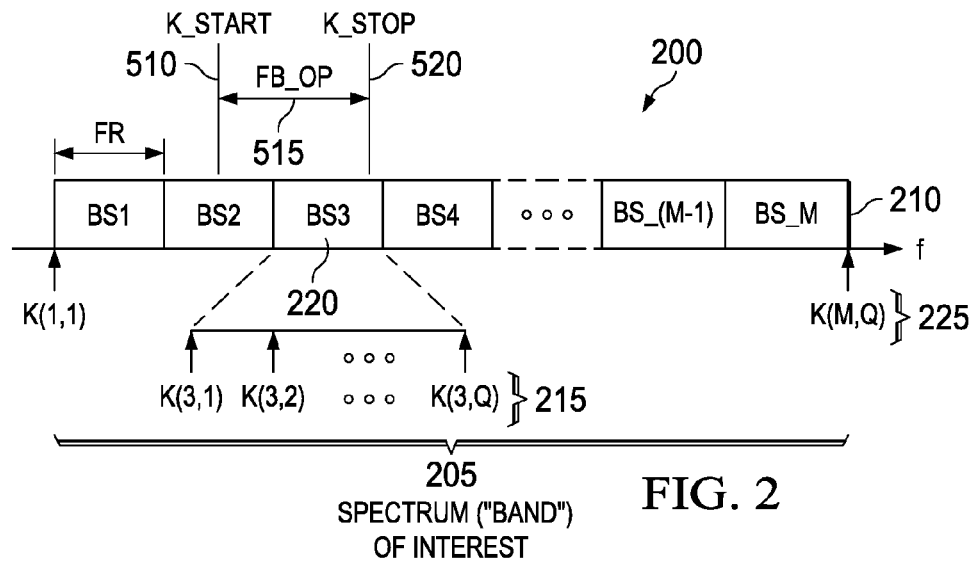
FIG. 2 is a spectral diagram showing a band of interest traversed by PLC apparatus of various embodiments capable of operating according to various methods.

FIG. 2 is a spectral diagram 200 showing a band of interest 205 traversed by PLC apparatus of various embodiments capable of operating according to various methods. The band of interest 205 is divided into a predetermined number M of frequency segments BS1, BS2 . . . BS_M 210, also referred to herein as "band segments." Each band segment is further divided into a set {K} of a predetermined number Q of OFDM subcarrier frequencies. Each subcarrier within the band of interest 205 is identified by a first index indicating the band segment to which it corresponds and a second index identifying its position 1 . . . Q within an OFDM subcarrier group for the band segment. Thus, for example, {K}=K(3,1), K(3,2) . . . K(3,Q) 215 is the set of subcarriers corresponding to BS3 220. The entire set of subcarriers across the band of interest 205 is {K}=K(1,1), K(1,2) . . . K(M,Q) 225.

Figure 3:
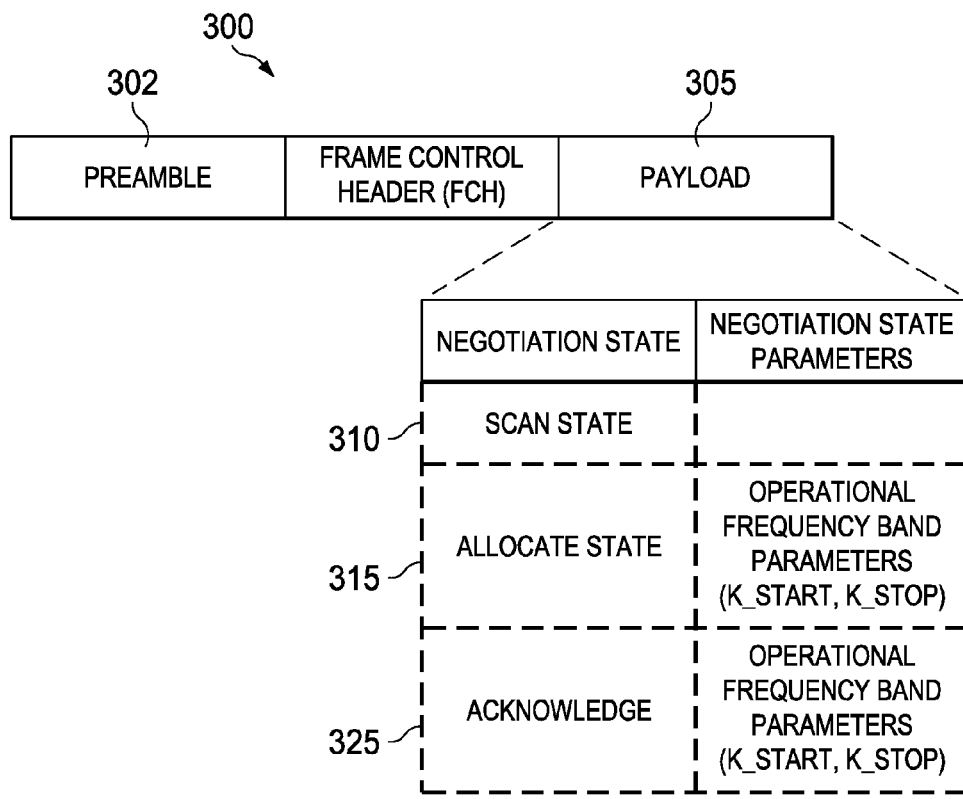
FIG. 3 is an example PLC negotiation mode physical ("PHY") frame illustrating states associated with operating band selection in PLC apparatus of various embodiments capable of operating according to various methods.

FIG. 3 is an example PLC negotiation mode physical ("PHY") frame 300. The frame 300 illustrates states associated with operating band selection in PLC apparatus of various embodiments capable of operating according to various methods. An identical frame 300 with the negotiation state set to "scan" is sent from an originating PLC node to a destination PLC node across each of the band segments 210 of FIG. 2. The scan frame is sent across one band segment at a time or across multiple band segments in parallel depending upon the capabilities of a particular PLC digital radio.

Figure 4A:
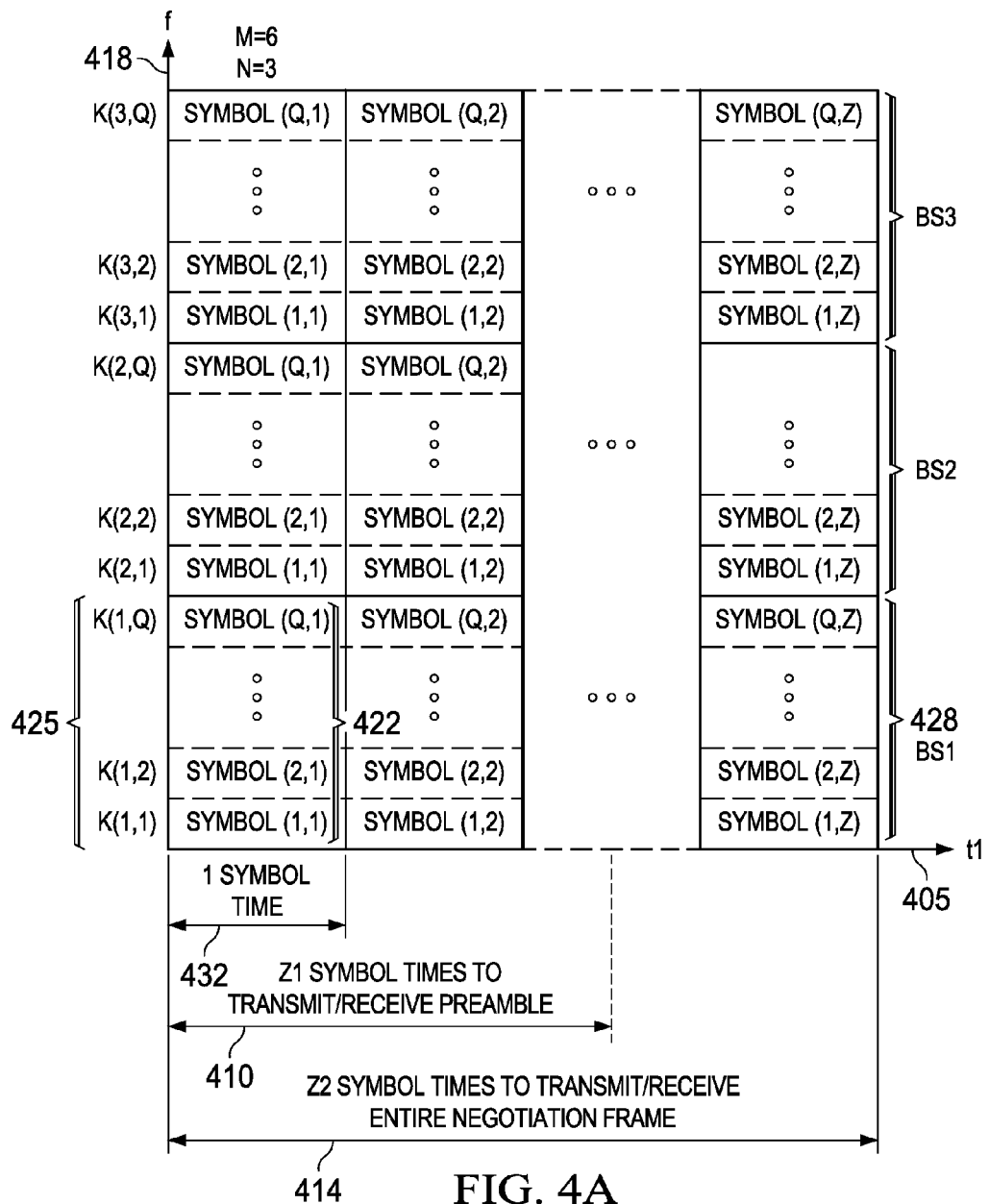
FIG. 4A is an example OFDM symbol map associated with a scan frame transmitted across a first set of three band segments by PLC apparatus of various embodiments capable of operating according to various methods.

FIG. 4A is an example OFDM symbol map associated with a scan frame transmitted across a first set of three band segments by PLC apparatus of various embodiments capable of operating according to various methods. The horizontal axis t1 405 is divided into symbol times of index Z. The scan frame preamble is Z1 410 symbol times long. The entire scan frame is Z2 symbol times long. The vertical axis 418 indicates a subcarrier K(i,q) within the subset of subcarriers {K}=K(i,1) . . . K(i,Q) corresponding to the band segment BS1 . . . BS_M on which any given symbol is transmitted at any given symbol time. Each symbol is indexed by the subcarrier index 1 . . . Q and by its symbol timeslot 1 . . . Z. Thus, for example, symbols (1,1) . . . (Q,1) 522 are transmitted on subcarriers K(1,1) . . . K(1,Q) corresponding to BS1 428 at symbol time 1 432.

It is noted that a symbol encoded on any given subcarrier within a given band segment at a given symbol time is repeated for the same subcarrier index 1 . . . Q across all other band segments for the same symbol time. Thus, for example, symbol (2,1) is encoded on subcarriers K(1,2), K(2,2), K(3,2), etc. The reason is that identical scan frames are transmitted across each band segment. It is also noted that the symbol map of FIG. 4A corresponds to an example case of the band of interest being divided into M=6 band segments BS1 . . . BS6 and the scan frame being transmitted across N=3 band segments at a time.

Figure 4B:
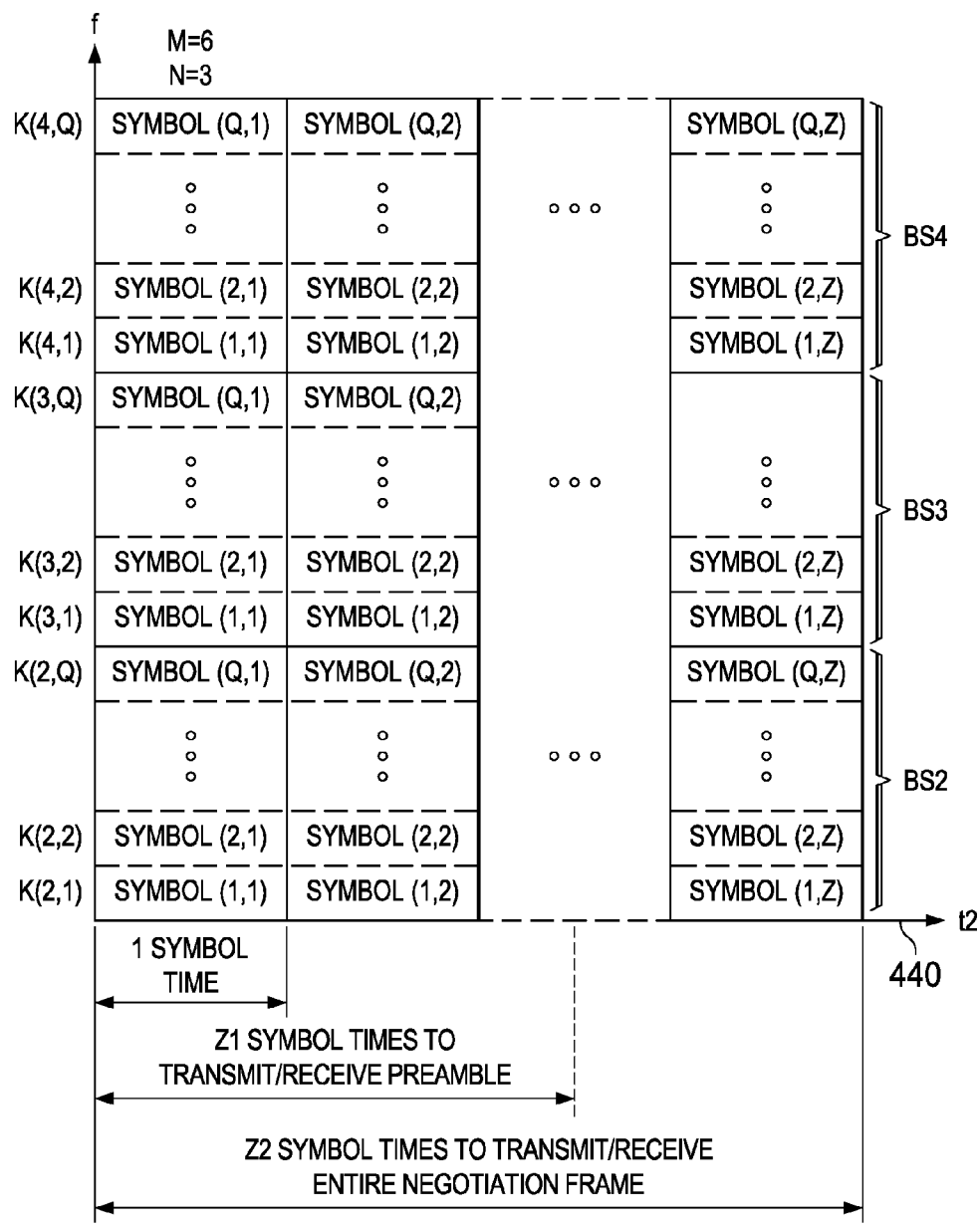
FIG. 4B is an example OFDM symbol map associated with a scan frame transmitted across a second set of three band segments by PLC apparatus of various embodiments capable of operating according to various methods.

FIG. 4B is an example OFDM symbol map associated with a scan frame transmitted across a second set of three band segments by PLC apparatus of various embodiments capable of operating according to various methods. FIG. 4B is equivalent to FIG. 4A in all respects except that the scan frame is shown as being transmitted across the N=3 band segments BS2, BS3, and BS4 during a second scan frame transmission time t2 440. Subcarrier band segment indices are changed from FIG. 4A accordingly.

Figure 4C:
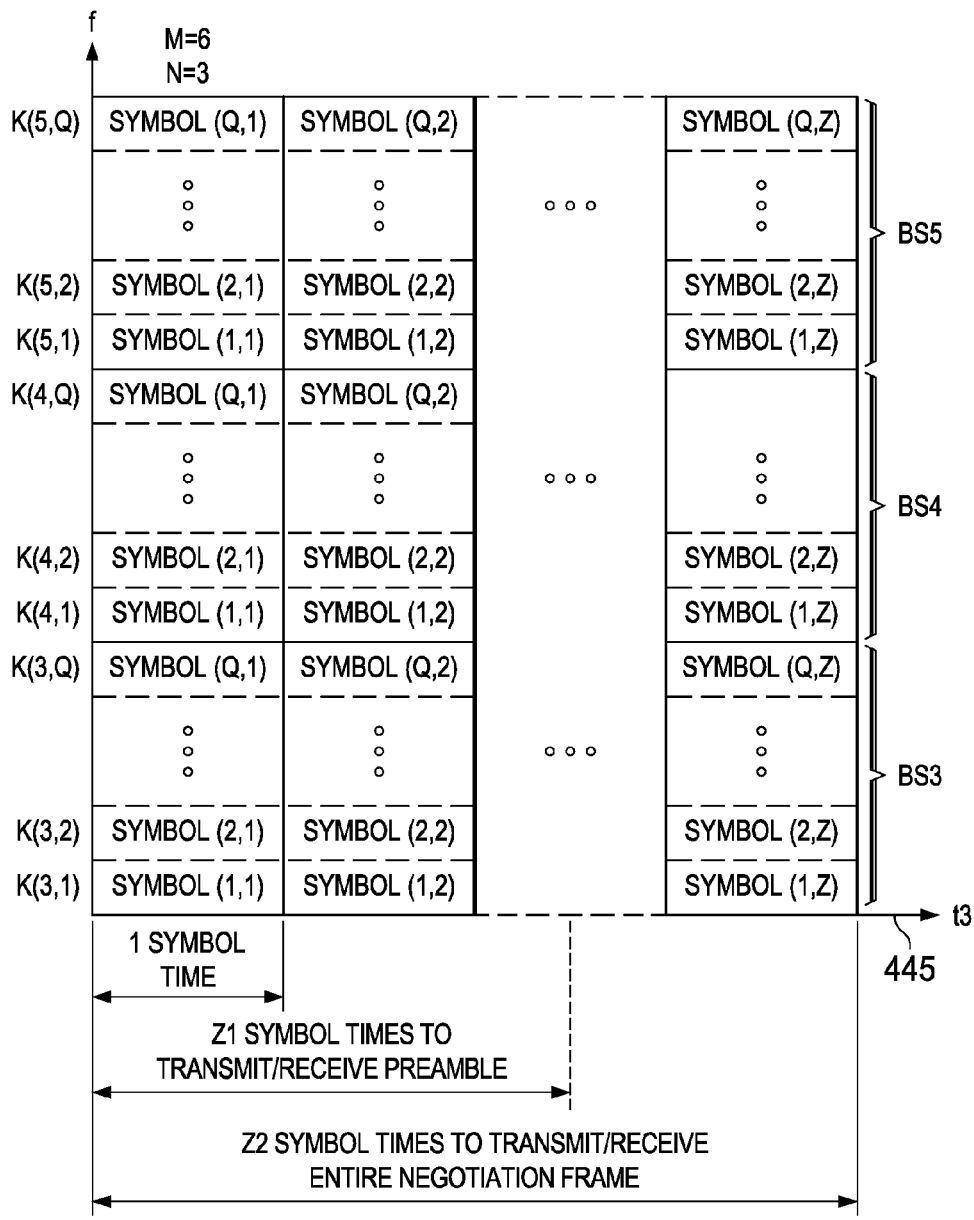
FIG. 4C is an example OFDM symbol map associated with a scan frame transmitted across a third set of three band segments by PLC apparatus of various embodiments capable of operating according to various methods.

FIG. 4C is an example OFDM symbol map associated with a scan frame transmitted across a third set of three band segments by PLC apparatus of various embodiments capable of operating according to various methods. FIG. 4C is equivalent to FIG. 4A in all respects except that the scan frame is shown as being transmitted across the N=3 band segments BS3, BS4 and BS5 during a third scan frame transmission time t3 445. Subcarrier band segment indices are changed from FIG. 4A accordingly.

Figure 4D:
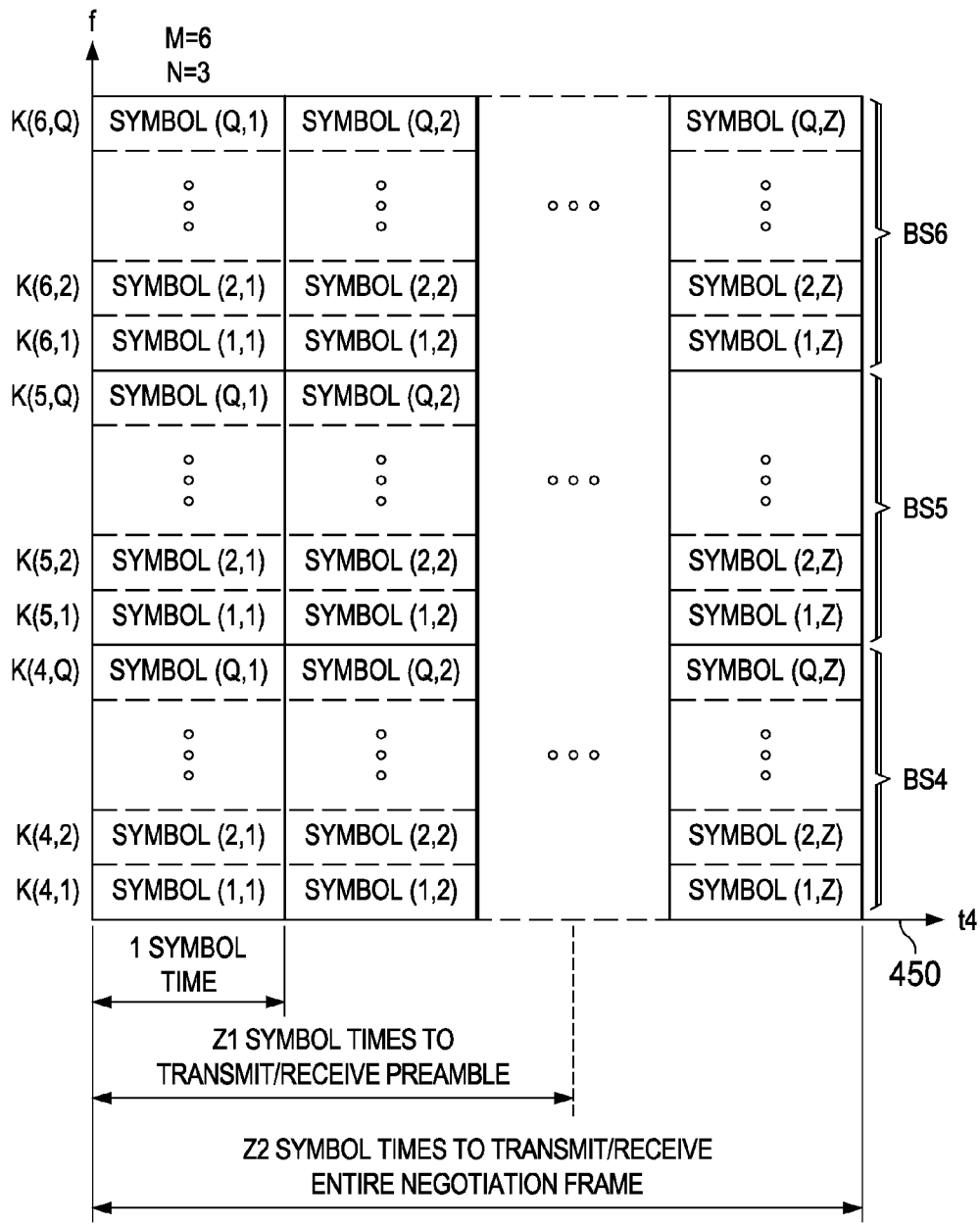
FIG. 4D is an example OFDM symbol map associated with a scan frame transmitted across a fourth set of three band segments by PLC apparatus of various embodiments capable of operating according to various methods.

FIG. 4D is an example OFDM symbol map associated with a scan frame transmitted across a fourth set of three band segments by PLC apparatus of various embodiments capable of operating according to various methods. FIG. 4D is equivalent to FIG. 4A in all respects except that the scan frame is shown as being transmitted across the N=3 band segments BS4, BS5 and BS6 during a fourth scan frame transmission time t4 550. Subcarrier band segment indices are changed from FIG. 4A accordingly.

From FIGS. 4A, 4B, 4C and 4D, and referring back to FIG. 2, it can be seen that example embodiments implementing these sequences send the scan frame across M=6 band segments 210 of the band of interest 205 N=3 band segments at a time during four scan frame transmission periods t1 405, t2 440, t3 445 and t4 450. In this example case, certain band segments overlap from one transmission time to another. Thus, for example, the scan frame is sent across BS2 twice, once during the period t1 405 and once during the period t2 440. The scan frame is sent across BS3 three times, once during t1 405, once during t2 440 and once during t3 445. The scan frame is also sent across BS4 and BS5 multiple times. Doing so increases the amount of SNR data available for SNR calculations but is not a requirement. Thus, for example, some embodiments may send the scan frame across N band segments at a time during M/N scan frame transmission periods. Doing so results in scan frame transmission only once across each band segment while still covering the entire M band segments of the band of interest.

It is also noted that the total number M of band segments into which the band of interest is divided may vary by embodiment/implementation. A band segment should contain an integral number of subcarriers according to a particular OFDM radio embodiment. Also, the number of band segments N across which the scan frame is sent simultaneously may vary from 1 to M. That is, the scan frame may be sent across only a single band segment at a time or, at the opposite extreme, across all M band segments at a time.

Turning back to FIGS. 2 and 3, a destination node scans the band segments 210 across the band of interest 205 asynchronously from the scan frame transmissions at the originating node. When the destination node senses a valid frame in a band segment currently being scanned, it measures signal strength and channel characteristics ("SNR parameters") of the recovered signal associated with each OFDM subcarrier at each symbol time 432. Some embodiments measure these signal strength and channel characteristics at each symbol time across only the scan frame preamble, for a total of Z1 symbol times 410. Other embodiments register these measurements at each symbol time across the entire scan frame, for a total of Z2 symbol times 414. Structures and methods herein then calculate an SNR value for each subcarrier using the measurements taken at each symbol time. This process continues until an SNR value corresponding to each subcarrier of each band segment across the band of interest is stored. Example structures and methods for calculating SNR values for each subcarrier are described in detail below. However, it is noted that subcarrier SNR values may be determined in various ways and that the invented operating band selection apparatus and methods are independent of the methods employed to calculate SNR.

The destination node may be configured to simultaneously receive scan frames sent in parallel across multiple band segments as described above with respect to scan frame transmission. Receiving and processing SNR values for all OFDM subcarriers across the band of interest results in a table of SNR values, one SNR value for each subcarrier. Suppose, for example, that the OFDM configuration operating in a given PLC embodiment utilizes 256 subcarriers. Suppose further that the band of interest is divided into ten band segments. The SNR table would, in this case, have stored 2,560 SNR values, one SNR value for each subcarrier associated with each band segment.

Figure 5:
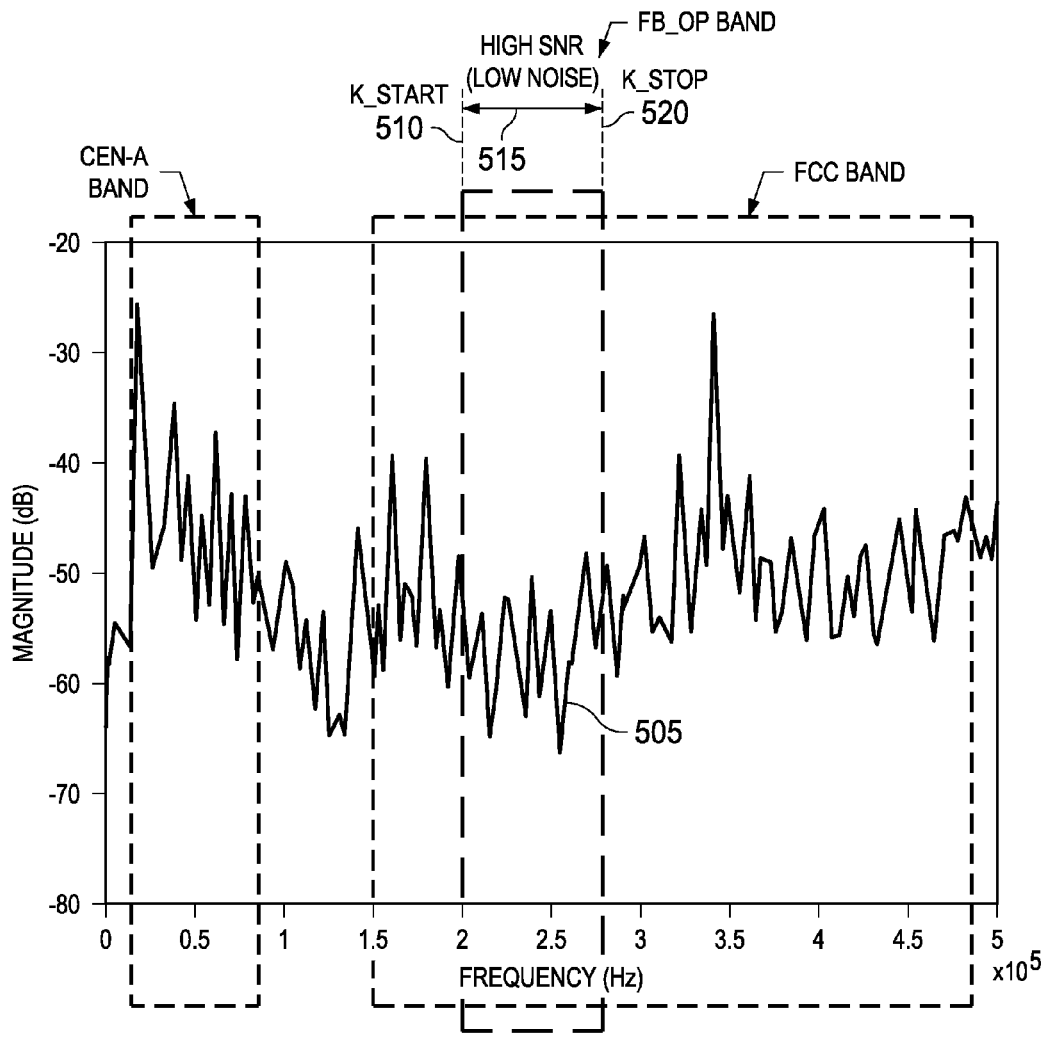
FIG. 5 is a spectral diagram of an example PLC signal plus noise associated with a PLC apparatus of various embodiments capable of operating according to various methods.

FIG. 5 is an example diagram of signal plus noise vs. frequency associated with a PLC apparatus of various embodiments capable of operating according to various methods herein. Structures and methods analyze the scan frame SNR table to find and select a contiguous set of SNR values resulting in a highest average SNR or an average SNR greater than a predetermined minimum value. Frequencies of a selected set of subcarriers corresponding to the selected contiguous set of SNR values define the selected operating band. That is, the frequency of the lowest-frequency subcarrier K_START is the start of the operating band FB_OP and the frequency of the highest-frequency subcarrier K_STOP is the end of the operating band FB_OP. The frequency difference between K_START and K_STOP is the width of FB_OP. It is noted that the magnitude 505 of signal plus noise shown in FIG. 5 is dominated by noise. Thus, the high-SNR band of operation FB_OP 515 selected by the invented embodiments and methods displays on FIG. 5 as a band of low noise.

Turning back to FIG. 2, the following consequences of selecting the operating band FB_OP 515 by analyzing SNR values associated with individual OFDM subcarriers across the band of interest 205 are noted. Subcarriers K_START 510 . . . K_STOP 520 associated with the newly-determined operating band FB_OP 515 do not in general lie at boundaries of the negotiation mode band segments 210. Nor, in general, is the bandwidth of FB_OP 515 equivalent to the bandwidth of a negotiation mode band segment. Consequently, the OFDM digital radio associated with PLC apparatus embodiments described herein will operate with a different number of subcarriers than the Q subcarriers used to carry the symbols of each scan frame.

PLC node apparatus operating according to methods herein exchange allocation frames indicating K_START_DOWN, K_STOP_DOWN, K_START_UP and K_STOP_UP or K_START_DOWN, K_START_UP, FB_OP_DOWN and FB_OP_UP and acknowledgments thereof. That is, the receiving/SNR calculating node communicates the operating channel to the transmitting node in the case of both the uplink and the downlink. Each OFDM operating mode frame is thereafter transmitted on the selected set of subcarriers K_START_DOWN . . . K_STOP_DOWN in the downlink and K_START_UP . . . K_STOP_UP in the uplink.

Figure 1:
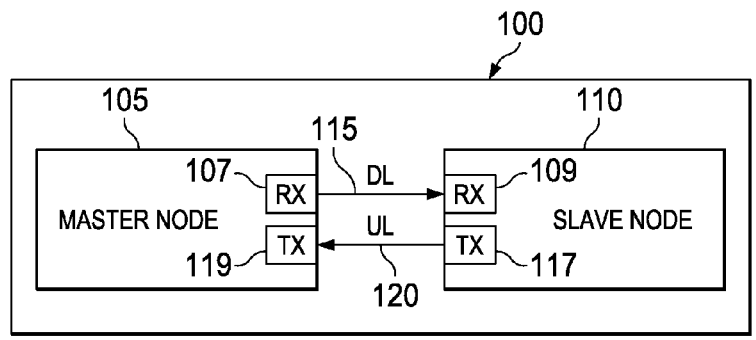
FIG. 1 is a prior-art block diagram of a power line communications ("PLC") system.
Figure 6A:
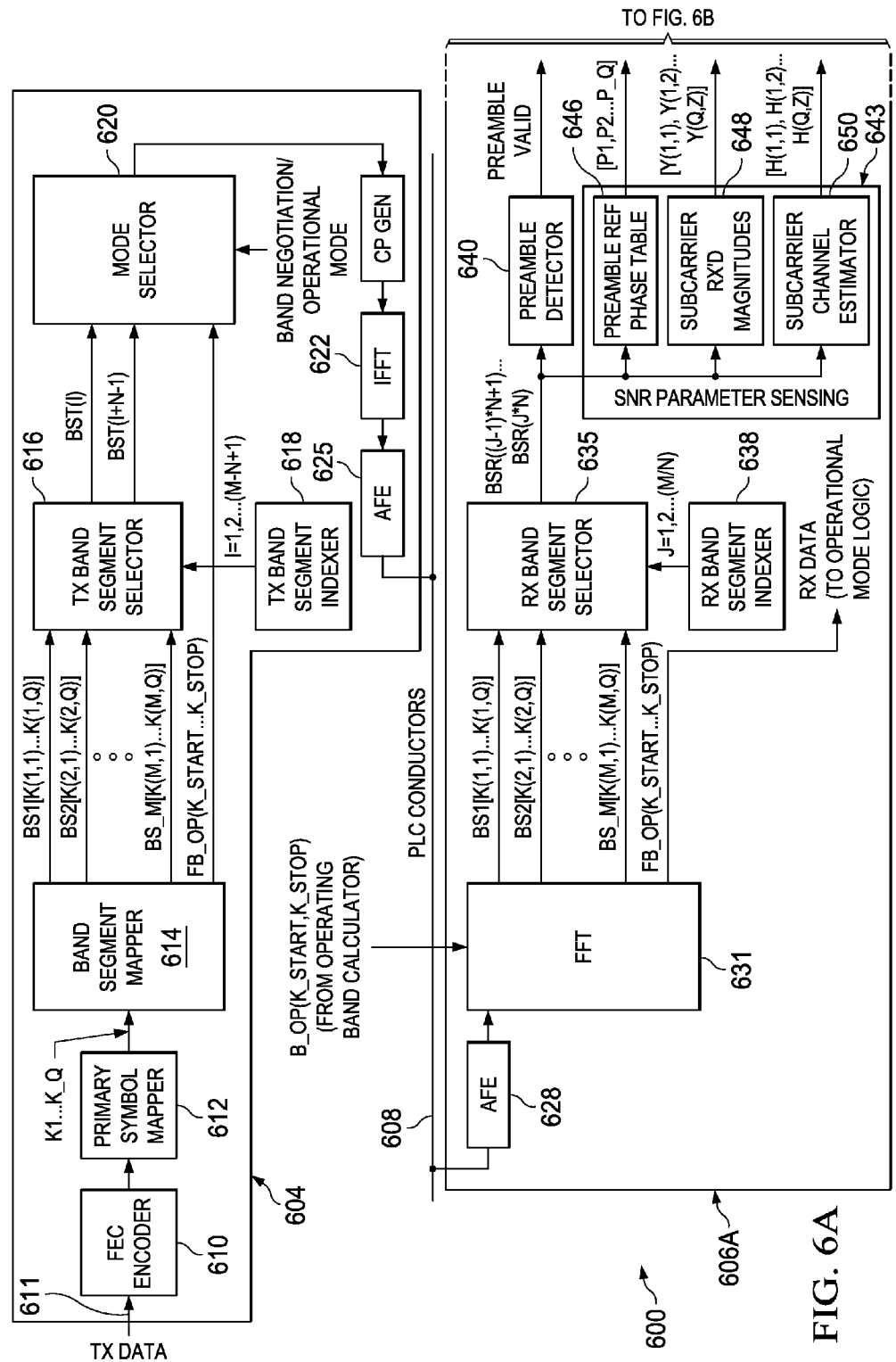
FIG. 6A is a block diagram of an example OFDM PLC apparatus according to various embodiments.
Figure 6B:
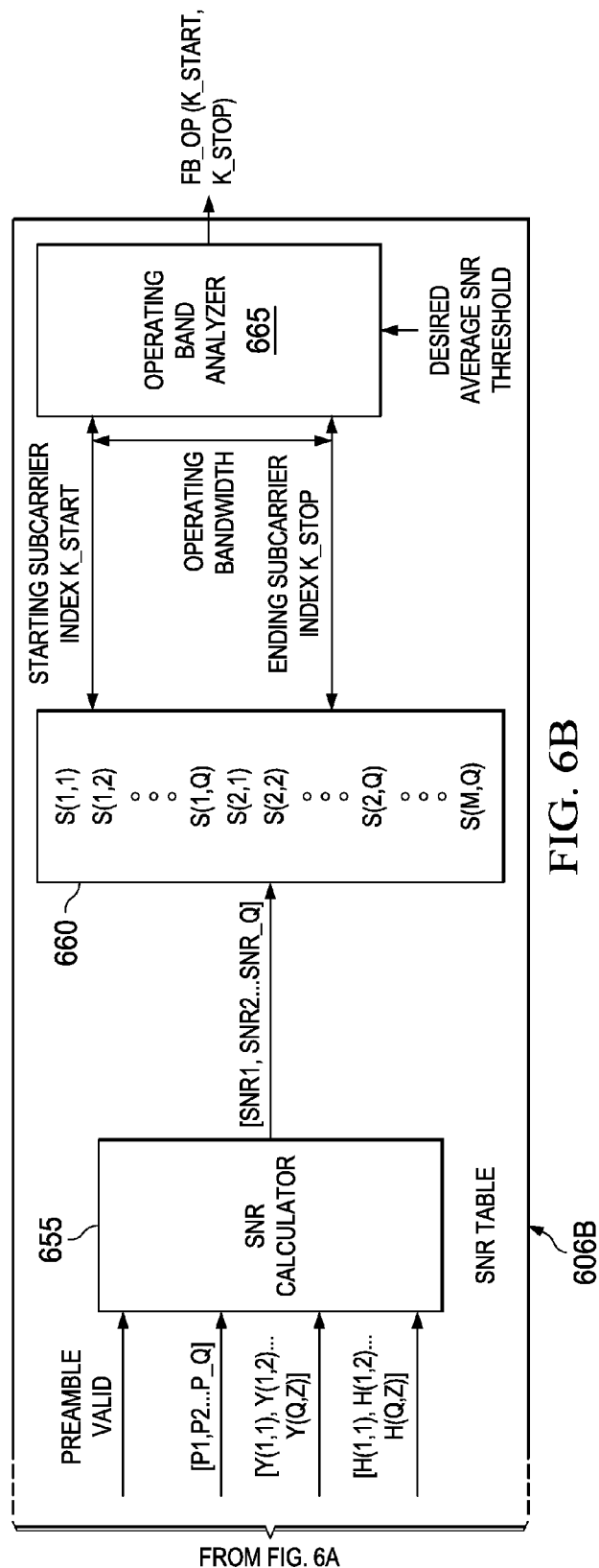
FIG. 6B is a continuation of the block diagram of FIG. 6A of the example OFDM PLC apparatus according to various embodiments.

FIG. 6A is a block diagram of an example OFDM PLC apparatus 600 according to various embodiments. The apparatus 600 operates identically at first and second PLC nodes (e.g., the first PLC node 110 and the second PLC node 105 of FIG. 1). FIG. 6B is a continuation of the block diagram of the PLC apparatus 600 of FIG. 6A. The PLC apparatus 600 includes a transmit section 604 and a receive section 606A and 606B. Although a single-node embodiment is illustrated and claimed, it is noted that the transmit section 604 assembles and sends frames to the second PLC node (not shown) on conductors 608. The receive section 606A, 606B receives and processes frames from the second PLC node (not shown).

Turning first to the transmit section 604, the PLC apparatus 600 includes a forward error correction ("FEC") encoder 610. The FEC encoder 610 receives a transmit data stream at an input terminal 611 of the apparatus 600. The FEC encoder 610 adds error correction information to the transmit data stream prior to transmission across a PLC link from the first PLC node to the second PLC node.

The OFDM PLC apparatus 600 also includes a primary symbol mapper 612 coupled to the FEC encoder 610. The primary symbol mapper 612 generates an OFDM symbol data set to encode data bits from the transmit data stream into a set of symbols to be carried by a set of OFDM subcarriers {K}. The apparatus 600 further includes a band segment mapper 614 coupled to the primary symbol mapper 612. The band segment mapper 614 generates M OFDM frequency domain transmit data sets. Each transmit data set consisting of values associated with the set of Q OFDM subcarriers {K}={K(1) . . . K(Q)} mapped to each of the M negotiation mode band segments BS1, BS2 . . . BS(M) within the frequency band of interest as previously described.

The apparatus 600 also includes a negotiation transmit mode band segment selector 616 coupled to the band segment mapper 612. The negotiation transmit mode band segment selector 616 selects N sets of subcarriers {K}={K(1) . . . K(Q)} at a time. The N selected sets of subcarriers carry symbols associated with a negotiation mode OFDM scan frame across a set of N corresponding negotiation transmit mode band segments {BST} to the second PLC node. The negotiation mode OFDM scan frame is transmitted across the M negotiation mode band segments within the band of interest N band segments at a time as previously described. In an example embodiment, the negotiation transmit mode band segment selector 616 may be configured to transmit the scan frame across the set of band segments {BST}=BST(I) . . . BST(I+N−1). The transmit segment index I increments until the scan frame is transmitted across all M band segments in the band of interest. In the latter example case, the band segments across which the scan frame is transmitted as the index I increments overlap as described above in a previous example.

The apparatus 600 further includes a negotiation transmit mode band segment indexer 618 coupled to the transmit mode band segment selector 616. The transmit mode band segment indexer 618 generates a negotiation transmit mode band segment index I. The index I indicates to the transmit mode band segment selector 616 the selected transmit mode band segments BST across which the negotiation mode OFDM scan frame is to be transmitted at a particular time. In some embodiments, the indexer 618 may increment the index I by one up to a maximum of the total number of band segments M less the number of band segments across which the scan frame is to be transmitted at a time N plus one. (I=1, 2 . . . (M−N+1)). Thus, for example, when the indexer reaches 1=2 and if the transmit band segment selector is configured to transmit across {BST}=BST(I) . . . BST(I+N−1), the scan frame is transmitted across band segments 2, 3 and 4.

The apparatus 600 also includes a mode selector 620 coupled to the transmit mode band segment selector 616 and to the band segment mapper 614. The mode selector 620 selects the sets of subcarriers {K}={K(1) . . . K(Q)} associated with the set of negotiation transmit mode band segments {BST} or a set of operating mode subcarriers K_START . . . K_STOP associated with an operating band FB_OP.

The apparatus 600 further includes an inverse fast-Fourier transform ("IFFT") section 622 coupled to the mode selector 620. The IFFT section 622 transforms frequency domain OFDM data sets associated with symbols to be transmitted into time domain information. The apparatus 600 also includes a PLC transmitter analog front-end ("AFE") section 625 coupled to the IFFT 622. The AFE section 625 conditions the time domain information for transmission across the PLC interconnect conductors 608.

Turning now to the receive section 606A, 606B, the OFDM PLC apparatus 600 includes a PLC receiver AFE section 628 coupled to the PLC interconnect conductors 608. The receiver AFE section 628 conditions signals associated with PLC frames received from the second PLC node and converts the signals to sets of digital data.

The OFDM PLC apparatus 600 also includes an FFT section 631 coupled to the AFE section 628. The FFT section 631 receives the conditioned signals in the form of the sets of digital data, transforms the sets of digital data into frequency domain information, and outputs the frequency domain information on subcarrier outputs associated with the received PLC frames.

The apparatus 600 also includes a negotiation receive mode band segment selector 635 coupled to the FFT 631.

The receive mode band segment selector 635 scans a total of M negotiation mode band segments BS1, BS2 . . . BS(M) within a band of interest. The receive mode band segment selector 635 selects one or more sets of Q subcarriers {K}={K(1) . . . K(Q)} at a time. Each set of subcarriers {K} is associated with each of a number N of the M band segments across which an identical scan frame may have been transmitted over a communication link by a transmitter at the second PLC node.

The apparatus 600 further includes a negotiation receive mode band segment indexer 638 coupled to the negotiation receive mode band segment selector 635. The negotiation receive mode band segment selector 635 generates a scan index J=1, 2 . . . M/N. The scan index J is used by the receive mode band segment selector 635 to select the sets {K} of Q subcarriers each. The sets {K} of subcarriers correspond to a set of negotiation mode band segments {BSR} and are selected for SNR evaluation at a selected time. Some embodiments of the negotiation receive mode band segment indexer 638 are configured to increment the scan index J from one to M/N. Some embodiments of the negotiation receive mode band segment selector 635 are configured to select sets of negotiation receive mode band segments {BSR}=BSR((J−1)*N+1) . . . BSR(J*N). Doing so results in the receiver section 606A, 606B to listen on N non-overlapping band segments at a time as the indexer 638 increments or decrements the scan index J by one at the beginning of each of N scan frame listening times. The latter is merely an example, however. The negotiation receive mode band segment selector 635 and the negotiation receive mode band segment indexer 638 may be configured to cause the receiver section 606A, 606B to listen on the M band segments one at a time or in any grouping at a time until SNR information is collected for all M band segments.

Some embodiments of the OFDM PLC apparatus 600 may also include a preamble detector 640 coupled to the receive mode band segment selector 635. The preamble detector 640 extracts frequency domain symbol information from a preamble associated with the scan frame.

The apparatus 600 also includes an SNR parameter sensing section 643 coupled to the receive mode band segment selector 635. The SNR parameter sensing section 643 measures signal and channel noise values used to determine an SNR value S(j,q) for each of the subcarriers K(j,q).

Some embodiments of the OFDM PLC apparatus 600 sense SNR parameters during the entire duration of the preamble Z1 410 of FIG. 4A, or a portion thereof. In the latter embodiments the SNR parameter sensing section 643 includes a preamble reference phase table 646, a subcarrier received magnitude section 648, and a subcarrier channel estimator 650, all coupled to the receive mode band segment selector 635. The preamble reference phase table 646 stores a predetermined reference phase value P(j,q) for each subcarrier K(j,q). The subcarrier received magnitude section 648 stores, for each subcarrier K(j,q), a value Y(j,q,z) of a magnitude of a signal received on the subcarrier K(j,q) at each symbol time z for a selected total number of preamble symbol times (e.g., the duration of the preamble Z1 410). The subcarrier channel estimator 650 stores scalar values of an instantaneous channel characteristic H(j,q,z) proportional to Y(j,q,z) less an instantaneous noise value n(j,q,z). A scalar value of H(j,q,z) is stored for each subcarrier K(j,q) at each symbol time z for the selected total number of preamble symbol times.

Some embodiments of the OFDM PLC apparatus 600 sense SNR parameters at frame times that may fall outside of the duration of the preamble. For example, these embodiments may sense SNR parameters for purposes of SNR calculation during the entire frame time Z2 414 of FIG. 4A, or a portion thereof. In such embodiments, the SNR parameter sensing section 643 includes a subcarrier received signal magnitude section 648, a subcarrier demodulated signal magnitude section (not shown), and a subcarrier channel estimator 650, all coupled to the receive mode band segment selector 635. The subcarrier received signal magnitude section 648 stores, for each subcarrier K(j,q), a value Y(j,q,z) of a magnitude of a signal received on the subcarrier K(j,q) at each symbol time z for a selected total number of symbol times (e.g., during the duration Z2 414 of the entire frame). The subcarrier demodulated signal magnitude section stores, for each subcarrier K(j,q), a value X(j,q,z) of a magnitude of a demodulated version of the signal received on the subcarrier K(j,q) at each symbol time z for the selected total number of symbol times. The subcarrier channel estimator 650 stores scalar values of an instantaneous channel characteristic H(j,q,z) proportional to Y(j,q,z) less an instantaneous noise value n(j,q,z). A scalar value of H(j,q,z) is stored for each subcarrier K(j,q) at each symbol time z for the selected total number of symbol times.

Turning to FIG. 6B, the apparatus 600 also includes an SNR calculator 655 coupled to the SNR parameter sensing section 643. The SNR calculator 655 determines an SNR value S(j,q) for each selected subcarrier K(j,q) for which frequency domain symbol information is detected. The SNR calculator 655 is configured to calculate S(j,q) by performing a matrix calculation on sets of SNR parameter values stored for each subcarrier K(j,q) at each symbol time z occurring during the selected total number of preamble symbol times Z.

Lower-case j is an index indicating the negotiation mode band segment and q is an OFDM signal subcarrier index. S(j,q) is a quotient of summations of the squares of equations manipulating the values of SNR parameters sensed by the SNR parameter sensing section 643. The summations are made of values sensed during a selected symbol period Z. In the case of embodiments which limit SNR parameter value sensing to preamble symbol times, the magnitude of the demodulated version of the signal X(j,q) may be pre-stored as a preamble reference phase P(j,q) given that the preamble symbols are known a priori. In that case:

$$S(j, q) = \frac{\sum_{z=1}^{Z1} |H_{(j,q,z)} P_{(j,q)}|^2}{\sum_{z=1}^{Z1} |Y_{(j,q,z)} - H_{(j,q,z)} P_{(j,q)}|^2}$$

where Z1 is the preamble symbol period or a selected portion thereof

More generally, in the case of embodiments which extend SNR parameter value sensing to periods beyond preamble symbol times:

$$S(j, q) = \frac{\sum_{z=1}^{Z2} |H_{(j,q,z)} X_{(j,q,z)}|^2}{\sum_{z=1}^{Z2} |Y_{(j,q,z)} - H_{(j,q,z)} X_{(j,q,z)}|^2}$$

where Z2 is the frame symbol time or a selected portion thereof.

The apparatus 600 also includes an SNR table 660 coupled to the SNR calculator 655. The SNR table 660 stores the SNR value S(j,q) calculated by the SNR calculator 655 for each subcarrier K(j,q). The apparatus 600 further includes an operating band analyzer 665 coupled to the SNR table 660. The operating band analyzer 655 is configured to determine when the SNR table 660 has been completely filled with available SNR values. It is noted that SNR values for some subcarriers may be unavailable for various reasons. The operating band analyzer 665 analyzes SNR values S(1,1) . . . S(M,Q) associated with the subcarriers K(1,1) . . . K(M,Q) across the band of interest. For example, some embodiments calculate incremental running averages of the SNR values S(1,1), S(1,2) . . . S(M,Q) in order to find a contiguous set of subcarriers resulting in a highest average SNR. The band analyzer 665 determines a lowest-frequency subcarrier K_START and a highest frequency subcarrier K_STOP associated with an operating frequency band FB_OP. K_START and K_STOP are selected such as to maximize an average SNR for communication across the link. In some embodiments, the operating band analyzer 665 terminates analysis operations upon finding an FB_OP with an average SNR greater than or equal to a selected threshold.

Figure 7A:
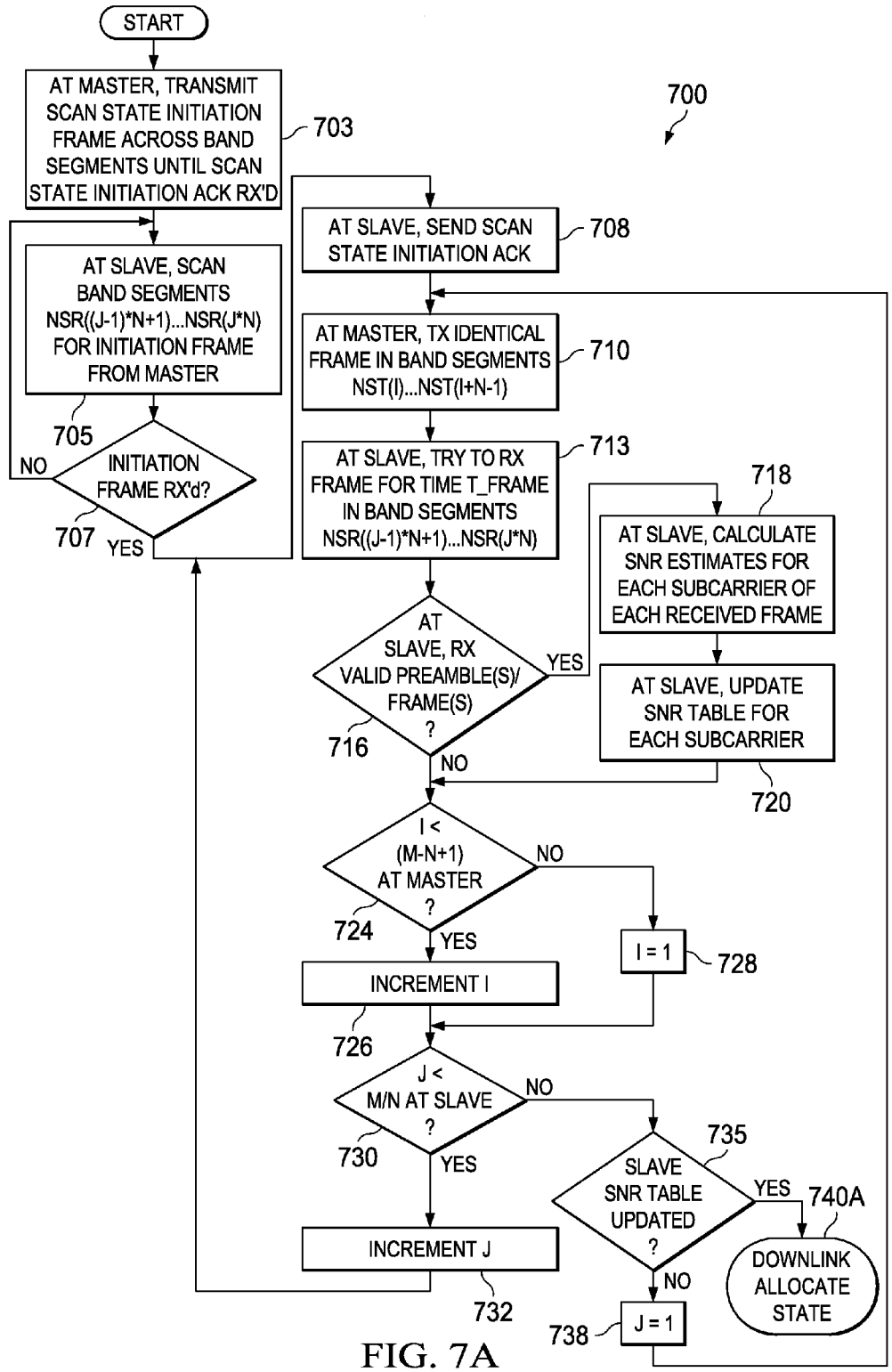
FIG. 7A is a flow diagram illustrating a method of selecting an operating band in an OFDM PLC system according to various example sequences.
Figure 7B:
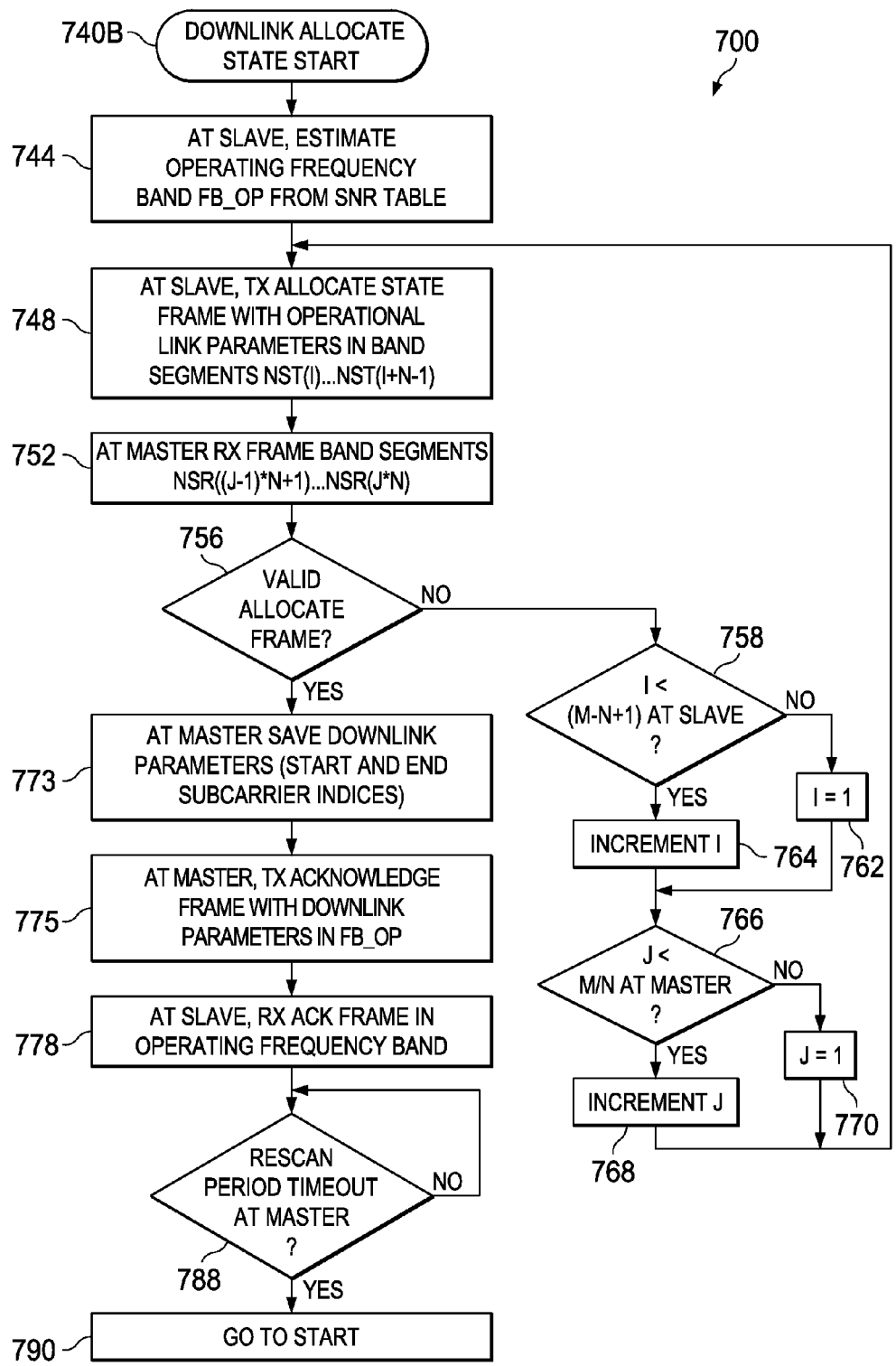
FIG. 7B is a continuation of the flow diagram illustrating a method of selecting an operating band in an OFDM PLC system.

FIG. 7A is a flow diagram illustrating a method 700 of selecting an operating band in an OFDM PLC system (e.g., the OFDM PLC apparatus 600 of FIGS. 6A and 6B) according to various example sequences. FIG. 7B is a continuation of the flow diagram of FIG. 7A. Master and slave PLC nodes are referred to herein as operating in the "scan state" while executing the operating band negotiation method 700. The method 700 is equally applicable to both the downlink and the uplink. That is, the master node engages in scan frame transmission sequences and the slave node engages in scan frame reception and analysis sequences in order to find an operating band for the downlink. The slave node engages in the same scan frame transmission sequences and the master node engages in the same scan frame reception and analysis sequences in order to find an operating band for the uplink. In the interest of brevity, sequences for determining the downlink operating band are recited below with reference to FIGS. 7A and 7B and are not repeated for the uplink.

It is noted, however, that the master node initiates the scan state and that the two nodes perform a handshake operation to confirm that both nodes have entered the scan state. The method 700 thus commences at the master node, by sending a scan state initiation frame across at least one of a number M of negotiation mode band segments, at block 703. The method 700 continues at block 705 with the slave node scanning the M negotiation mode band segments for at least one valid preamble associated with the scan state initiation frame. Some versions of the method 700 include selecting a frame with a highest SNR as measured from the preamble. In the latter case, the selected highest-SNR frame is then decoded in its entirety in order to read the payload field to confirm the frame as a scan state initiation frame, at block 707.

The method 700 includes the slave node sending a scan state initiation acknowledgment and entering the scan state upon determining that the frame is a scan state initiation frame, at block 708. With both nodes operating in the scan state, the method 700 proceeds according to the following example flow for both the downlink and the uplink. The following example is recited from the point of view of determining the operating band for the downlink. However, the example applies equally to activities for determining the operating band for the uplink. It is noted that the operating band for the downlink may be different for that of the uplink.

The method 700 continues at block 710 with the master node transmitting a master node negotiation mode scan frame across each of the M negotiation mode band segments within the frequency band of interest in the downlink. The method 700 also includes the slave node attempting to receive the master node scan frame while scanning each of the M band segments in the downlink, at block 713. The method 700 further includes determining whether a valid preamble and/or entire frame has been received at the slave node from a scanned band segment, at block 716. Some versions of the method 700 determine received scan frame validity from the preamble while other versions may determine scan frame validity from extra-preamble portions of the received frame.

The method 700 also includes estimating, for each negotiation mode scan frame received from each of M negotiation mode band segments BS1, BS2 . . . BS(M), a set of downlink SNR values. One downlink SNR value is determined for each OFDM subcarrier within each band segment as previously described in detail above. Some versions of the method 700 determine SNR values during preamble-only symbol times. Other versions determine SNR values for entire frames or for portions of frames outside of preamble symbol times. The method 700 further includes updating an SNR table as an SNR value is determined for each subcarrier, at block 720. The SNR table includes an SNR value entry for each OFDM subcarrier in the band of interest.

The method 700 also includes evaluating an index I at the master node following each scan frame transmission or group of transmissions in the downlink. The index I is used to select the one or more band segments across which the master node sends scan frames in the downlink. The current value of the index I is tested at block 724 to determine whether the upper-most band segment in the band of interest has been reached. If not, the method 700 includes incrementing the index I, at block 726. If the master node has reached the upper-most band segment, the method 700 includes resetting the index I, at block 728. As noted previously, the master node continues to send scan frames across N band segments at a time and repeats the process until the slave node has updated the SNR value estimates in the SNR table for all subcarriers in all of the M band segments across the band of interest.

Operating asynchronously from the master node indexing operation pointed to by the index I, the slave node scans the M band segments using an index J. The slave node selects a group of one or more band segments at a time, pointed to by the index J, to listen for scan frames from the master node. The method 700 includes testing the current value of the index J to determine whether the slave node has reached the upper-most band segment NSR(M) in its scanning process, at block 730. If not, the method 700 includes incrementing the index J, at block 732. If the slave node has reached the upper-most band segment, the method 700 includes determining, at block 735, whether the SNR table has been updated with available SNR estimates for each subcarrier across the band of interest. If not, the method 700 includes resetting the listening index J at the slave node to continue scanning from the lowest-indexed group of band segments. If the slave node determines that the SNR table has been updated with available SNR estimates for each subcarrier, the method 700 includes transitioning to the allocate state, at block 740A.

The method 700 continues at block 744 with analyzing the set of downlink SNR values at the slave node. The slave node reads the SNR values from its downlink SNR table and searches for a contiguous subset of highest SNR values. "Contiguous subset" means that each SNR value of the subset of SNR values corresponds to a subcarrier that is adjacent to another subcarrier of the subset on the frequency spectrum. Some versions of the method 700 calculate moving averages of various subsets of SNR values from the SNR table in order to find the contiguous subset of highest SNR values. However, it is noted that versions of the method 700 may search for the subset of highest SNR values in various ways. The highest-SNR subset corresponds to a selected subset of downlink OFDM subcarriers {K_DOWN}={K_START_DOWN . . . K_STOP_DOWN}. K_START_DOWN is the lowest-frequency subcarrier of the selected subset and K_STOP_DOWN is the highest frequency subcarrier of the selected subset, resulting in an operating frequency band for the downlink, FB_OP_DOWN.

The method 700 continues at the slave node with transmitting a downlink allocate state frame across each of the M negotiation mode band segments in the uplink, at block 748. The allocate state frames include operating downlink parameters associated with FB_OP_DOWN such as K_START_DOWN, K_STOP_DOWN the bandwidth or number of subcarriers associated with FB_OP_DOWN, etc.

The method 700 also includes scanning the M band segments for the allocate state frame at the master node, at block 752. The slave node transmit index I and the master node receive index J are tested, incremented and reset at blocks 758, 762, 764, 766, 768 and 770. Doing so causes the slave node to periodically transmit the allocate state frame in each of the M band segments across the band of interest and the master node to continually scan the M band segments, listening for the allocate state frame until received, at block 756.

At the master node, the method 700 includes saving the operating downlink parameters, at block 773, and transmitting a downlink allocate acknowledge frame in the allocated downlink FB_OP_DOWN, at block 775. The method 700 further includes receiving the allocate acknowledge frame and subsequent downlink frames in FB_OP_DOWN at the slave node, at block 778.

In summary, the method 700 includes transmitting OFDM scan frames from a sending node across subcarriers associated with band segments within a band of interest. Doing so generates coherent energy in the subcarriers from which an SNR value may be determined by a receiving node for each subcarrier. A group of adjacent subcarriers with a highest overall SNR is then selected as an operating band for the PLC link (either the downlink or the uplink). However, received SNR values may degrade in the selected operating band as machinery or other sources of RFI are switched on and off. Accordingly, some versions of the method 700 include a rescan timeout clock, at block 788. A new scan state may be initiated following a rescan timeout, at block 790. Alternatively or in addition, some versions of the method 700 may initiate a rescan if received SNR values decrease below an acceptable threshold.

Figure 8:
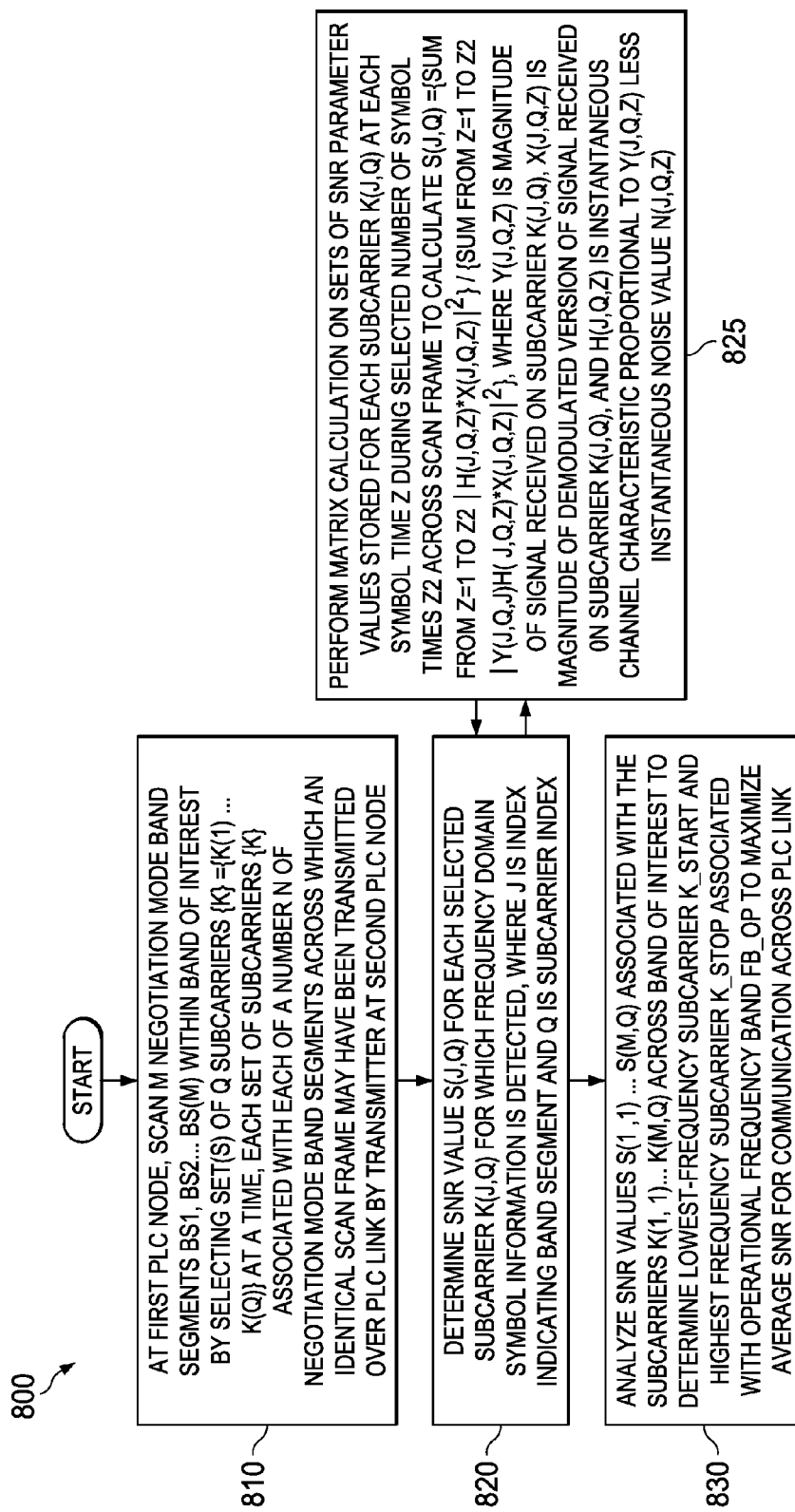
FIG. 8 is a flow diagram illustrating a method of selecting an operating band in an OFDM PLC apparatus according to various example sequences.

FIG. 8 is a flow diagram illustrating a method 800 of selecting an operating band in an OFDM PLC apparatus (e.g., in the apparatus 600 of FIGS. 6A and 6B) according to various example sequences.

The method 800 commences at block 810 with scanning M negotiation mode band segments BS1, BS2 . . . BS(M) within a band of interest at a first PLC node. The band segments are scanned by selecting one or more sets of Q subcarriers {K}={K(1) . . . K(Q)} at a time. Each set of subcarriers {K} is associated with each of a number N of negotiation mode band segments across which an identical scan frame may have been transmitted over a PLC communication link by a transmitter at a second PLC node.

The method 800 includes determining an SNR value S(j,q) for each selected subcarrier K(j,q) for which frequency domain symbol information is detected, at block 820. The index j indicates the one or more the negotiation mode band segments being listened to and q is an OFDM signal subcarrier index indicating one of a number Q of subcarriers associated with the band segment j.

Each S(j,q) is determined by performing a matrix calculation on a set of SNR parameter values stored for each subcarrier K(j,q) at each symbol time z occurring during a selected total number of symbol times Z2 across the scan frame, at block 825. S(j,q) is calculated as:

$$S(j, q) = \frac{\sum_{z=1}^{Z2} |H_{\{j,q,z\}} X_{\{j,q,z\}}|^2}{\sum_{z=1}^{Z2} |Y_{\{j,q,z\}} - H_{\{j,q,z\}} X_{\{j,q,z\}}|^2}.$$

Y(j,q,z) is the magnitude of a signal received on the subcarrier K(j,q). X(j,q,z) is the magnitude of a demodulated version of the signal received on the subcarrier K(j,q). H(j,q,z) is an instantaneous channel characteristic proportional to Y(j,q,z) less an instantaneous noise value n(j,q,z).

The method 800 also includes analyzing SNR values S(1,1) . . . S(M,Q) associated with the subcarriers K(1,1) . . . K(M,Q) across the band of interest, at block 830. SNR values S(1,1) . . . S(M,Q) are analyzed according to activities previously described with reference to FIG. 7B. The analysis reveals an operating frequency band FB_OP of subcarriers K_START . . . K_STOP resulting in a highest average SNR for communication across the PLC link. Some versions of the method 800 may terminate the analysis upon finding an FB_OP with an average SNR greater than or equal to a specified value.

Apparatus and methods described herein may be useful in applications other than finding a PLC operating frequency band of highest SNR within a band of interest. The examples of the apparatus 600 and of the methods 700 and 800 described herein are intended to provide a general understanding of the structures of various embodiments and the sequences of various methods. They are not intended to serve as complete descriptions of all elements and features of apparatus, systems and methods that might make use of these example structures and sequences.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Accordingly, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An orthogonal frequency division multiplexing ("OFDM") power line communication ("PLC") apparatus, comprising:
   a negotiation receive mode band segment selector in a receiver coupled to PLC interconnect conductors at a first PLC node to scan a total of M negotiation mode band segments BS1, BS2 . . . BS(M) within a band of interest by selecting at least one set of Q subcarriers {K}={K(1) . . . K(Q)} at a time, each set of subcarriers {K} associated with each of a number N of the M band segments across which an identical scan frame may have been transmitted over a communication link by a transmitter at a second PLC node;
   a signal-to-noise ratio ("SNR") calculator communicatively coupled to the receive mode band segment selector to determine an SNR value S(j,q) for each selected subcarrier K(j,q) for which frequency domain symbol information is detected, j being an index indicating the negotiation mode band segment and q being an OFDM signal subcarrier index;
   an operating band analyzer communicatively coupled to the SNR calculator to analyze SNR values S(1,1) . . . S(M,Q) associated with the subcarriers K(1,1) . . . K(M,Q) across the band of interest and to determine a lowest-frequency subcarrier K_START and a highest frequency subcarrier K_STOP associated with an operating frequency band FB_OP such as to maximize an average SNR for communication across the link.

2. The OFDM PLC apparatus of claim 1, further comprising:
   a negotiation receive mode band segment indexer coupled to the negotiation receive mode band segment selector to generate a scan index J=1, 2 . . . M/N, the scan index J to be used by the receive mode band segment selector to select the sets Q of subcarriers {K} corresponding to negotiation mode band segments BSR to be selected for SNR evaluation at a selected time.

3. The OFDM PLC apparatus of claim 2, the scan index J=1, 2 . . . M/N and the selected negotiation mode band segments being BSR(j) . . . BSR(J*N), where j=(J−1)*N+1.

4. The OFDM PLC apparatus of claim 1, further comprising:
an SNR parameter sensing section coupled to the receive mode band segment selector to measure signal and channel noise values used to determine the SNR value S(j,q) for each of the subcarriers K(j,q).

5. The OFDM PLC apparatus of claim 4, the SNR parameter sensing section further comprising:
a preamble reference phase table coupled to the SNR calculator to store a predetermined reference phase value P(j,q) for each subcarrier K(j,q);
a subcarrier received magnitude section coupled to the SNR calculator to store, for each subcarrier K(j,q), a value Y(j,q,z) of a magnitude of a signal received on the subcarrier K(j,q) at each symbol time z for a selected total number of preamble symbol times Z1; and
a subcarrier channel estimator to coupled to the SNR calculator to store, for each subcarrier K(j,q) at each symbol time z for the selected total number of preamble symbol times Z1, a scalar value of an instantaneous channel characteristic H(j,q,z) proportional to Y(j,q,z) less an instantaneous noise value n(j,q,z).

6. The OFDM PLC apparatus of claim 5, further comprising:
an SNR table coupled to the SNR calculator to store the SNR value S(j,q) for each subcarrier K(j,q), the SNR calculator configured to calculate S(j,q) by performing a matrix calculation on sets of SNR parameter values stored for each subcarrier K(j,q) at each symbol time z occurring during the selected total number of preamble symbol times Z1 as $$S(j,q) = \frac{\sum_{z=1}^{Z1} |H_{(j,q,z)} P_{(j,q)}|^2}{\sum_{z=1}^{Z1} |Y_{(j,q,z)} - H_{(j,q,z)} P_{(j,q)}|^2}.$$

7. The OFDM PLC apparatus of claim 4, the SNR parameter sensing section further comprising:
a subcarrier received signal magnitude section coupled to the SNR calculator to store, for each subcarrier K(j,q), a value Y(j,q,z) of a magnitude of a signal received on the subcarrier K(j,q) at each symbol time z for a selected total number of preamble symbol times Z2;
a subcarrier demodulated signal magnitude section coupled to the SNR calculator to store, for each subcarrier K(j,q), a value X(j,q,z) of a magnitude of a demodulated version of the signal received on the subcarrier K(j,q) at each symbol time z for a selected total number of symbol times Z2; and
a subcarrier channel estimator to coupled to the SNR calculator to store, for each subcarrier K(j,q) at each symbol time z for the selected total number of preamble symbol times Z2, a scalar value of an instantaneous channel characteristic H(j,q,z) proportional to Y(j,q,z) less an instantaneous noise value n(j,q,z).

8. The OFDM PLC apparatus of claim 7, further comprising:
an SNR table coupled to the SNR calculator to store the SNR value S(j,q) for each subcarrier K(j,q), the SNR calculator configured to calculate the SNR value S(j,q) by performing a matrix calculation on sets of SNR parameter values stored for each subcarrier K(j,q) at each symbol time z occurring during the selected total number of symbol times Z2 as $$S(j,q) = \frac{\sum_{z=1}^{Z2} |H_{(j,q,z)} X_{(j,q,z)}|^2}{\sum_{z=1}^{Z2} |Y_{(j,q,z)} - H_{(j,q,z)} X_{(j,q,z)}|^2}.$$

9. The OFDM PLC apparatus of claim 1, the operating band analyzer configured to determine when the SNR table has been completely filled with available SNR values and to calculate incremental running averages of the SNR values S(1,1), S(1,2) . . . S(M,Q) in order to find a contiguous set of subcarriers resulting in a highest average SNR.

10. The OFDM PLC apparatus of claim 1, further comprising:
a preamble detector coupled to the receive mode band segment selector to extract frequency domain symbol information from a preamble associated with the scan frame;
a PLC receiver analog front-end ("AFE") section communicatively coupled to the receive mode band segment selector to receive and condition signals associated with received PLC frames; and
a fast-Fourier transform (FFT) section coupled to the AFE to receive the conditioned signals, to transform the conditioned signals to frequency domain information, and to output the frequency domain information on subcarrier outputs associated with the received PLC frames.

11. The OFDM PLC apparatus of claim 1, further comprising:
a band segment mapper in a transmitter at the first PLC node, the band segment mapper to generate M OFDM frequency domain transmit data sets, each transmit data set consisting of values associated with the set of Q OFDM subcarriers {K}={K(1) . . . K(Q)} mapped to each of the M negotiation mode band segments BS1, BS2 . . . BS(M) within the frequency band of interest;
a negotiation transmit mode band segment selector to select at least one of the sets of subcarriers {K}={K(1) . . . K(Q)} at a time to carry symbols associated with a negotiation mode OFDM scan frame across a selected negotiation transmit mode band segment BST to a second PLC node, the negotiation mode OFDM scan frame to be transmitted across the M negotiation mode band segments within the band of interest N band segments at a time; and
a negotiation transmit mode band segment indexer coupled to the transmit mode band segment selector to generate a negotiation transmit mode band segment index I, the index I to indicate to the transmit mode band segment selector the selected transmit mode band segments BST across which the negotiation mode OFDM scan frame is to be transmitted.

12. The OFDM PLC apparatus of claim 11, the negotiation transmit mode band segment index I=1, 2 . . . (M−N+1) and the selected negotiation transmit mode band segments BST=BST(I) . . . BST(I+N−1).

13. The OFDM PLC apparatus of claim 11, further comprising:

a primary symbol mapper coupled to the band segment mapper to generate an OFDM symbol data set to encode data bits from the transmit data stream into a set of symbols to be carried by the set of OFDM subcarriers {K}; and a forward error correction ("FEC") encoder coupled to the primary symbol mapper to receive a transmit data stream at an input terminal of the OFDM PLC apparatus and to add error correction information to the transmit data stream prior to transmission across a PLC link from the first PLC node to the second PLC node.

14. The OFDM PLC apparatus of claim 11, further comprising:

a mode selector coupled to the transmit mode band segment selector and to the band segment mapper to select the sets of subcarriers {K}={K(1) . . . K(Q)} associated with the negotiation transmit mode band segments BST or a set of operating mode subcarriers K_START . . . K_STOP associated with an operating band FB_OP;

an inverse fast-Fourier transform ("IFFT") section coupled to the band segment mapper to transform frequency domain OFDM data sets associated with symbols to be transmitted into time domain information; and a PLC transmitter analog front-end ("AFE") section communicatively coupled to the IFFT to condition the time domain information for transmission across the PLC interconnect conductors.

15. A method of selecting an operating frequency band in an orthogonal frequency division multiplexing ("OFDM") power line communication ("PLC") system, comprising:

at a PLC slave node, from a set of PLC master node negotiation mode scan frames received from M negotiation mode band segments BS1, BS2 . . . BS(M) within a frequency band of interest in a PLC system downlink, determining a set of downlink SNR values, one downlink SNR value for each OFDM subcarrier within the band of interest;

at the slave node, analyzing the set of downlink SNR values to find a lowest-frequency subcarrier K_START_DOWN and a highest frequency subcarrier K_STOP_DOWN associated with an operating frequency band FB_OP_DOWN such as to maximize an average downlink SNR for a reception of frames from a PLC master node in the downlink;

at the master node, from a set of slave node negotiation mode scan frames received from a set of M negotiation mode band segments in the frequency band of interest in a PLC system uplink, determining a set of uplink SNR values, one uplink SNR value for each OFDM subcarrier within the band of interest; and at the master node, analyzing the set of uplink SNR values to find a lowest-frequency subcarrier K_START_UP and a highest frequency subcarrier K_STOP_UP associated with an operating frequency band FB_OP_UP such as to maximize an average uplink SNR for a reception of frames from the slave node in the uplink.

16. The method of selecting an operating frequency band in an OFDM PLC system of claim 15, further comprising:

at the master node, transmitting a master node negotiation mode scan frame across each of the M negotiation mode band segments within the frequency band of interest in the downlink;

at the slave node, attempting to receive the master node negotiation mode scan frame in each of the M negotiation mode band segments in the downlink;

at the slave node, transmitting a slave node negotiation mode scan frame across each of the M negotiation mode band segments in the uplink; and at the master node, attempting to receive the slave node negotiation mode scan frame in each of the M negotiation mode band segments in the uplink.

17. The method of selecting an operating frequency band in an OFDM PLC system of claim 15, further comprising:

at the slave node, transmitting a downlink allocate state frame including operating downlink parameters associated with FB_OP_DOWN across each of the M negotiation mode band segments in the uplink;

at the master PLC node, receiving the downlink allocate state frame, saving the operating downlink parameters, and transmitting a downlink allocate acknowledge frame and subsequent downlink frames in FB_OP_DOWN;

at the master PLC node, transmitting an uplink allocate state frame including operating uplink parameters associated with FB_OP_UP across each of the M negotiation mode band segments in the downlink; and at the slave PLC node, receiving the uplink allocate state frame, saving the operating uplink parameters, and transmitting an uplink allocate acknowledge frame and subsequent uplink frames in FB_OP_UP.

18. The method of selecting an operating frequency band in an OFDM PLC system of claim 15, further comprising:

at the master node, sending a scan state initiation frame across at least one of the M negotiation mode band segments;

at the slave node, scanning the M negotiation mode band segments for at least one valid preamble associated with the scan state initiation frame;

at the slave node, decoding the entire scan state initiation frame as received in the band segment resulting in a highest signal-to-noise ("SNR") ratio as measured from the valid preamble; and at the slave node, entering a scan state upon decoding the scan state initiation frame.

19. A method of selecting an operating frequency band in an orthogonal frequency division multiplexing ("OFDM") power line communication ("PLC") apparatus, comprising:

at a first PLC node, scanning M negotiation mode band segments BS1, BS2 . . . BS(M) within a band of interest by selecting at least one set of Q subcarriers {K}={K (1) . . . K(Q)} at a time, each set of subcarriers {K} associated with each of a number N of negotiation mode band segments across which an identical scan frame may have been transmitted over a communication link by a transmitter at a second PLC node;

determining an SNR value S(j,q) for each selected subcarrier K(j,q) for which frequency domain symbol information is detected, j being an index indicating the negotiation mode band segment and q being an OFDM signal subcarrier index; and analyzing SNR values S(1,1) . . . S(M,Q) associated with the subcarriers K(1,1) . . . K(M,Q) across the band of interest to determine a lowest-frequency subcarrier K_START and a highest frequency subcarrier K_STOP associated with an operating frequency band FB_OP such as to maximize an average SNR for communication across the communication link.

20. The method of selecting an operating frequency band in an OFDM PLC apparatus of claim 19, further comprising:

performing a matrix calculation on sets of SNR parameter values stored for each subcarrier K(j,q) at each symbol time z occurring during a selected total number of symbol times Z2 across the scan frame to calculate $$S(j, q) = \frac{\sum_{z=1}^{Z2} |H_{\{j,q,z\}} X_{\{j,q,z\}}|^2}{\sum_{z=1}^{Z2} |Y_{\{j,q,z\}} - H_{\{j,q,z\}} X_{\{j,q,z\}}|^2},$$

$Y(j,q,z)$ being a magnitude of a signal received on the subcarrier $K(j,q)$, $X(j,q,z)$ being a magnitude of a demodulated version of the signal received on the subcarrier $K(j,q)$, and $H(j,q,z)$ being an instantaneous channel characteristic proportional to $Y(j,q,z)$ less an instantaneous noise value $n(j,q,z)$.

* * * * *